(12) United States Patent
Brown

(10) Patent No.: US 11,540,661 B2
(45) Date of Patent: Jan. 3, 2023

(54) WATER PREPARATION SYSTEM

(71) Applicant: Wendell D. Brown, Henderson, NV (US)

(72) Inventor: Wendell D. Brown, Henderson, NV (US)

(73) Assignee: Wendell D. Brown, Henderson, NV (US)

(*) Notice: Subject to any disclaimer, the term of this patent is extended or adjusted under 35 U.S.C. 154(b) by 186 days.

(21) Appl. No.: 16/509,349

(22) Filed: Jul. 11, 2019

(65) Prior Publication Data

US 2021/0008508 A1   Jan. 14, 2021

(51) Int. Cl.
*A47J 31/40* (2006.01)
*A47J 31/41* (2006.01)
*A47J 31/60* (2006.01)

(52) U.S. Cl.
CPC ............ *A47J 31/407* (2013.01); *A47J 31/41* (2013.01); *A47J 31/40* (2013.01); *A47J 31/605* (2013.01)

(58) Field of Classification Search
CPC ......... A47J 31/407; A47J 31/41; A47J 31/605
USPC ................................................. 99/295, 286
See application file for complete search history.

(56) References Cited

U.S. PATENT DOCUMENTS

| | | | | |
|---|---|---|---|---|
| 4,978,550 | A | * | 12/1990 | Menon .................... B01D 61/08 210/257.2 |
| 2004/0237793 | A1 | * | 12/2004 | Zurcher .............. A47J 31/3642 99/275 |
| 2009/0105875 | A1 | * | 4/2009 | Wiles ...................... A47J 31/52 700/239 |
| 2009/0219140 | A1 | * | 9/2009 | Guard ................ A47J 31/4407 340/10.1 |
| 2015/0375926 | A1 | * | 12/2015 | Fischer .............. A47J 31/3642 99/289 R |
| 2018/0049582 | A1 | * | 2/2018 | Rehfuss ............... B67D 1/0078 |
| 2018/0129361 | A1 | * | 5/2018 | Suh ......................... G07F 9/001 |
| 2018/0132507 | A1 | * | 5/2018 | Siegel ....................... A23L 2/54 |
| 2021/0106163 | A1 | * | 4/2021 | Van De Sluis ....... A47J 31/407 |

* cited by examiner

*Primary Examiner* — Reginald Alexander
(74) *Attorney, Agent, or Firm* — Park, Vaughan, Fleming & Dowler LLP

(57) ABSTRACT

A system, apparatus and method are provided for preparing water for human consumption. Water from a public or other source is input to the system or apparatus and is filtered internal or external to the system/apparatus. A temperature adjustment may be applied, such as cooling or heating the water to a specific or approximate temperature. One or more water enhancements may be added to the water, in specified amounts or proportions. Enhancements potentially include flavoring agents, sweeteners, vitamins, nutrients, minerals, carbonation, and so on. A given combination of enhancements and corresponding amounts, and possibly other characteristics (e.g., the temperature, a quantity of water to prepare), may be saved as a recipe. The system, apparatus and method operate in association with an application or online service for creating, sharing, and preparing recipes.

17 Claims, 5 Drawing Sheets

WATER PREPARATION SYSTEM

BACKGROUND

This disclosure relates to the field of water preparation. More particularly, a system, apparatus and methods are provided for preparing water for human consumption.

In many locales around the world, tap water delivered by public and/or private authorities does not suit consumers' tastes. Also, some consumers may question the composition, quality or safety of their tap water. Other consumers may be averse to water that is fluoridated and/or chlorinated.

As one result, a large and growing market in bottled water has developed. Bottled water purchased by consumers to replace or augment water delivered to their homes and/or places of business may come from different sources and/or have different characteristics or components than their delivered water. For example, some consumers prefer bottled water that is captured at a natural source (e.g., a spring) without being processed by a municipal water authority. Others prefer the taste of a particular brand of bottled water, perhaps due to its composition of minerals.

Unfortunately, bottled water is relatively expensive (especially in comparison to tap water) and most plastic water bottles are not recycled, thereby wasting resources. Unrecycled plastic waste (including empty water bottles) significantly contributes to pollution and constitutes an increasing threat to earth's oceans and marine life. Consumers who find their tap water as delivered to be unsatisfying or unpalatable may wish to avoid contributing to this problem by not purchasing bottled water, but their options are presently very limited.

SUMMARY

In some embodiments, a system, apparatus and methods are provided for preparing water for human consumption and delivering it on demand. In these embodiments, the system includes a water preparation appliance that prepares and dispenses water according to a specified recipe. Depending on the configuration of the system and the device, recipe options regarding how the water may be treated prior to dispensing may include filtering, heating or cooling, and augmenting the water with desired enhancements (e.g., flavors, sweeteners, vitamins, supplements, carbonation).

A water preparation appliance includes a water input, which may be a permanent connection (e.g., to a municipal water authority) or a reservoir that is filled as needed by a user. The appliance may include one or more filters to remove or neutralize sediment, dissolved solids (e.g., minerals) and organisms. Filtered water is heated or cooled depending on the user's specified desire.

The appliance also features a collection of water enhancements, which may be in the form of cartridges or other compact containers. Depending on a water recipe being prepared by the appliance, virtually any quantity and mixture of the enhancements may be added to the water. After it is enhanced as specified, the prepared water is dispensed for the user's consumption.

DETAILED DESCRIPTION

Figure 1:
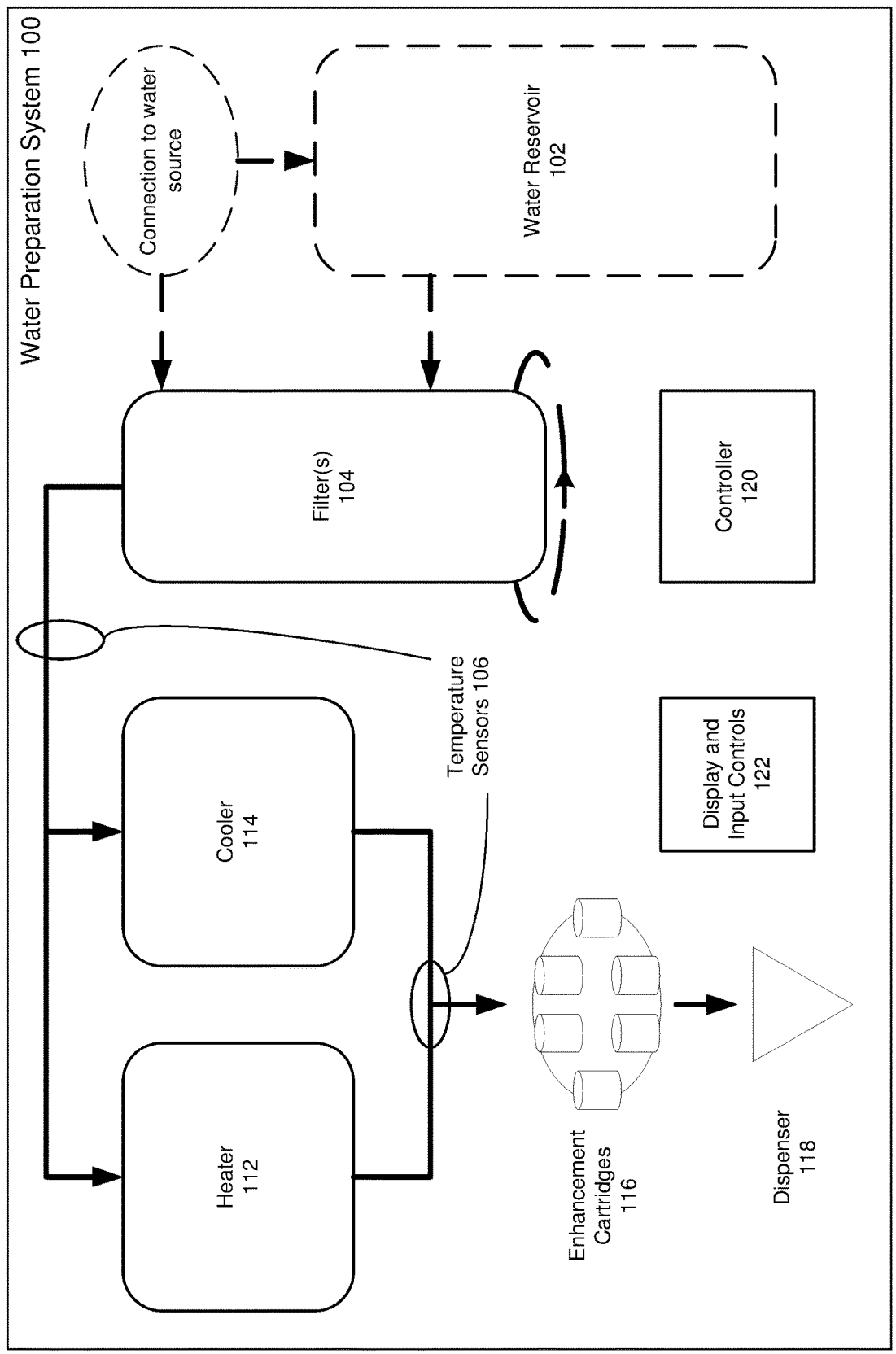
FIG. 1 is a block diagram depicting a water preparation system, in accordance with some embodiments.

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments a system, method, and apparatus for preparing and dispensing water are provided. In these embodiments, a water preparation apparatus prepares and dispenses the water according to a consumer's selected options and/or a specified recipe. A recipe or preparation option may include enhancing the water with one or more additives (e.g., flavoring agents, carbonation, nutrients, sweeteners), heating or chilling the water, filtering the water in some manner (e.g., repeating a filter cycle, using one type of filtering action instead of another), and/or treating the water in some other way.

Recipes may be programmed into the water preparation system or apparatus, and/or may be manually specified by a user. According to a selected recipe or the user's manual selections, the system will add the desired enhancements in the appropriate proportions to water that the system has already filtered, after or before heating or chilling it as desired.

In some embodiments, water enhancements the system may employ are cartridge-based, meaning that different cartridges containing different enhancements may be installed at different times, and may be exchanged/replaced as necessary, and that the recipes and enhancement options that may be applied during a given usage depend upon the installed cartridges. A user may be prompted to insert or replace cartridges to ensure the necessary enhancements are available.

The system may include a communication interface and a compatible app or application may be installed on a user's communication or computing device (e.g., a smart phone, a laptop computer). The application enables remote programming and/or operation of the water preparation system, facilitates the creation, storage and/or sharing of recipes (e.g., via online networks and/or services), displays statuses and alerts to a user, and/or has other features. In some implementations the communication interface may include (but is not limited to) Bluetooth®, Bluetooth LE, and/or Wi-Fi® technology.

Statuses/alerts that may be provided to a user via an application (and/or via a display panel of the water preparation apparatus), may indicate which enhancement cartridges are installed, how full (or empty) the installed cartridges are, which recipes can (or cannot) be currently prepared, the status of a filter (e.g., whether/when it needs to be replaced), a current water level in a reservoir, a current temperature in a reservoir of heated or cooled water, etc. In addition, as water is being prepared, the system may display (via the application or display panel) statuses such as TDS (Total Dissolved Solids) before and/or after water received by the system is filtered, which stage the preparation is in (e.g., filtering, heating/cooling, adding enhancements), an estimated time of completion (or estimated period of time until the water is ready for consumption), etc.

In addition to statuses and alerts, the system and corresponding application provide menus or lists of recipes. For example, a menu of favorites and/or most recently/frequently used recipes may be available for quick selection. Recipes may also or instead be categorized by enhancements (e.g., the primary enhancement(s) in each recipe), sources of the recipes (e.g., friends, system manufacturer), calories, system user (e.g., if multiple consumers use the system), temperature (e.g., heated vs. cooled), and/or other factors.

In some embodiments, the system tracks the status (e.g., capacity, accumulated usage) of enhancement cartridges. For example, when a new cartridge is installed, it is registered with the system based on a unique code or identification obtained from the cartridge, along with its initial (full) capacity. As the contents of the cartridge are expended, the system tracks the outflow of those contents to maintain an exact or estimated measure of its remaining contents. Therefore, when a cartridge is temporarily removed (e.g., to use a different cartridge in its place) and then replaced, its status is retrieved and made available for continued updating.

Cartridge statuses may be stored within the system and/or at one or more remote locations. Illustratively, the statuses may allow the system to determine when a cartridge should be replaced (in which case a user or other entity may be notified), whether a cartridge has sufficient contents to enable preparation of a desired water recipe, whether a cartridge's contents have expired, and/or to make other determinations.

In addition, the water preparation system may use a cartridge's stored status to determine when to deactivate the cartridge to prevent its further use. For example, the cartridge may be deactivated after the accumulated usage statistics indicate that it should be empty or after it has expired. Thus, if a recipe calls for contents from a cartridge that has been determined to be depleted, the system may require replacement of the cartridge (or installation of another cartridge with the same contents), even if the cartridge had been refilled by a user or other entity.

One benefit of a water preparation system or apparatus described herein is that a water consumer is able to customize a serving of water to his or her taste using a recipe designed on the spot or generated beforehand by the consumer or some other party. Some recipes may be configured to prepare water to match that which is sold in a bottled form, in terms of flavor, temperature, mineral content, and/or other characteristics.

FIG. 1 is a block diagram of a water preparation system according to some embodiments. The diagram identifies some components of the systems and functions it may perform, but does not limit the configuration of a system constructed according to other embodiments. For example, the size and/or constituent components of a water preparation system or apparatus provided herein according to FIG. 1 may vary depending on whether it is configured for private use or for commercial use, and/or other factors. A water preparation apparatus described herein may alternatively be referred to as an appliance.

Water preparation system 100 of FIG. 1 includes a connection to (or input from) a water source such as a public or municipal water utility, and/or reservoir 102 that can be filled by a user with tap water or water from some other source. For example, the water preparation system may include a fixed or removable water tank that is filled by a user. Alternatively, a permanent water inlet may automatically deliver water to the system (e.g., to reservoir 102 or filter(s) 104) as necessary, based on demand.

Filter(s) 104 filter water received from reservoir 102 and/or an external source to remove sediment, dissolved solids, minerals, chlorinating agents, and/or other contaminants. Depending on the type and/or configuration of the filter(s), organisms (e.g., bacteria, viruses, parasites) may or may not be neutralized or removed.

As indicated above, configurations of water preparation system 100 may differ for use in different environments (e.g., home, office, industrial), and the composition of filter(s) 104 may differ accordingly. For example, a water preparation system or device configured for private or home use may be relatively small in size and filter(s) 104 may comprise a gravity-fed activated carbon filter or activated alumina water filter, and/or a pressure-fed reverse osmosis system. In implementations in which a multi-state reverse osmosis filtration system is employed, water preparation system 100 includes an output or drain for waste water.

In other configurations, filter(s) 104 may employ one of the preceding types of filtering action or some other type (e.g., a ceramic filter), and may also (or instead) employ deionization, ultraviolet radiation, and/or infrared technology to neutralize impurities or organisms. In addition to, or instead of, a filter that features ultraviolet and or ionization/deionization, ultraviolet radiation and/or ionization/deionization may be applied to water as it wends through water preparation system 100, so as to sterilize the water and/or nearby components of the system.

As shown in FIG. 1, filtered water may be returned and re-filtered until a sensor indicates that a desired level of purity or cleanliness has been achieved. For example, a maximum TDS could be programmed such that water is not released for heating or cooling until the measured TDS is at or below the target.

In some embodiments, filter(s) 104 and a source of water may be separate from a remainder of system 100. In particular, filter(s) 104 and/or water reservoir 102 may be located apart from components of system 100 that perform heating/cooling and that add enhancements.

Although not pictured in FIG. 1, one or more sensors may be placed to measure the TDS and/or other characteristics of water entering and/or leaving filter(s) 104. In particular, TDS, pH, color, dissolved oxygen, and/or turbidity may be measured before and/or after the water is filtered.

For example, an electronic tongue type of sensor, which may be (or may be part of) a replaceable component of the system, may combine cyclic voltammetry conductance measurements of the water (using electrodes composed of one or more metals) with suitable machine-learning algorithms/models to measure or estimate ionic components of the water. Output of this type of sensor may be provided to a user and/or may be used to adjust a water recipe to complement or counteract detected minerals and/or other impurities.

Data from the sensor may also cause a conditioning enhancement to be used, or to cause a recommendation to the user to add a conditioning enhancement to a recipe. For example, to counteract or balance particularly hard or soft water, one or more conditioning enhancements may be added to a recipe to improve the water, either automatically (based on sensor data) or upon instruction from the user.

Yet further, a geographical region or area in which the water preparation is installed may be automatically detected (and/or input by a user), using an IP (Internet Protocol) address of the system for example, and data reflecting the average or typical water quality may be used to select conditioning enhancements to be added to a recipe.

In some embodiments, reservoir 102 or an additional reservoir may store water that has been filtered. For example, when a permanent water source is connected via appropriate plumbing, reservoir 102 may store filtered water instead of water received directly from the permanent source. Or, a secondary reservoir (not shown in FIG. 1) may be included in system 100 to store filtered water.

Filtered water is fed to heater 112 and cooler 114 as called for by an active water recipe. Heater 112 and cooler 114 may heat/cool on demand (e.g., according to a currently active water recipe) or separate reservoirs of heated and/or cooled water may be provided. For example, in some embodiments system 100 may include separate insulated enclosures of heated and cooled water, which may each store a quantity of water sufficient for one or more servings of a default or preferred size.

In some embodiments, heater 112 and/or cooler 114 comprise thermoelectric components, such as cartridge heaters and/or Peltier devices for example. Water to be heated or cooled may be repeatedly cycled/looped by or through such a component (or multiple such components) until it reaches a desired temperature, or the heating/cooling may be applied statically to an appropriate quantity of water. In some alternative embodiments, a resistive-type heating element may be used to heat water and/or an external chiller or cooling system may cool water. For example, water preparation system 100 may be installed within or may operate in association with a refrigerator that provides chilled water. As another example, a water dispenser that heats or cools water and dispenses it (e.g., a water dispenser that operates with user-replaceable 5-gallon bottles) may be configured to include components of a water preparation system or appliance (e.g., enhancement cartridges, a mixer, a filter).

In embodiments in which heating/cooling water to the desired temperature requires multiple applications of the corresponding components of system 100, heater 112 and/or cooler 114 include the necessary plumbing to loop the water by or through the heater or cooler. Alternatively, paths external to the heater and cooler and not shown in FIG. 1 may reroute the water as necessary.

Temperature sensors 106 are placed after (and possibly before) the filtered water is heated or cooled. The sensors may thus drive operation of heater 112 and cooler 114 to ensure the water is heated or chilled to the desired temperature (or a higher or lower temperature to allow for cooling or heating of the water before it is dispensed).

After a serving of water is heated/cooled to a desired temperature (i.e., if heating/cooling is desired), it is enhanced with one or more additives from enhancement cartridges 116 before or while it is dispensed by dispenser 118 into a receptacle (e.g., a glass). For example, the enhancements may be added to the water stream or may be delivered to the receptacle in parallel with the dispensing of the water. Different embodiments of a water preparation system may include different means for mixing water and water enhancements (e.g., in a reservoir not shown in FIG. 1), such as a jet mixer or pump, a mechanical agitator (e.g., a rotating agitator, a paddle agitator), a static mixer or agitator (e.g., a conduit fitted with baffles), a bubbler agitator, a magnetic stirrer, etc.

Illustrative enhancements include flavorings or flavoring agents (e.g., syrups, oils), nutrients, vitamins, minerals, sweeteners, coloring agents, tea, coffee, other additives (e.g., caffeine), etc. A given enhancement may be liquid or may include solids (such as powders or granules) that may be fully or partially dissolvable.

Some enhancements may be designed for purposes other than enhancing water for consumption. For example, a cleaning enhancement cartridge could contain vinegar and/or some other agent for cleaning, decalcifying, and/or otherwise improving the performance, appearance or operation of system 100. When system 100 is instructed to prepare a recipe that involves use of a cleaning enhancement, it may also automatically process and dispense additional water for rinsing internal components (e.g., dispenser 118) after the cleaning.

Cartridges 116 are replaceable by users of water preparation system 100, and different embodiments of system 100 may accommodate different numbers of cartridges (e.g., 6, 8, 12). In some implementations the cartridges feature or operate in conjunction with a food-grade piezoelectric nozzle/injector, peristaltic pump, or droplet generator (e.g., piezoelectric or acoustic) to enable precise measures of their contents to be delivered when and as needed. In other implementations different technologies may be employed, such as syringe, elastomeric, diaphragm, and/or micro pumps.

Cartridges may have embedded or printed identification features, such as RFID (radio-frequency identification) tags or labels, QR (Quick Response) codes, text, barcodes, microprocessors, etc. In some implementations, data may be printed on cartridges' exterior surfaces using an ink that is invisible to the human eye (e.g., infrared or ultraviolet ink).

The water preparation system 100 may employ one or more optical sensors (e.g., cameras, charge-coupled devices or CCDs) to read external cartridge identification features, and circuitry (e.g., controller 120, an RFID reader) or other means for electronically communicating with cartridges 116 when they are installed and/or during operation of the system (e.g., to read electronic data within the cartridge). Therefore, when a cartridge is successfully identified by the system, relevant data such as type of enhancement (e.g., cherry flavor, stevia sweetener), cartridge serial number, manufacturer, date of creation and/or expiration, volume or quantity of the enhancement, concentration of the enhancement, and so on, may be retrieved from a local or remote data source or from the cartridge itself. Cartridges may be constructed of a compostable material, such as polylactic acid or polylactide (PLA).

Controller 120 comprises a microprocessor or another type of processing component for controlling operation of water preparation system 100. Display and input controls 122 include one or more output components (e.g., a liquid crystal display, a light-emitting diode, a speaker) and one or more input components (e.g., soft or hard buttons, switches). Illustratively, after a user operates the input components/controls or uses a compatible application operating on an electronic device to specify a recipe, controller 120 ensures the correct amount of water is made available, that it is heated/cooled to an appropriate temperature, and that the corresponding enhancements are added in the correct quantities. The display component may display the status of the water preparation as it proceeds.

The controller may also enforce restrictions, such as a maximum or minimum amount of water that may be dispensed at one time, a maximum or minimum temperature of dispensed water, a maximum amount of an enhancement (e.g., caffeine, a sweetener, a flavoring agent), etc. A maximum or minimum value enforced by the controller may be set and/or adjusted (e.g., by a user, by a central authority).

As mentioned above, in some embodiments an application is provided to facilitate operation of a water preparation system or appliance. The application may be configured for operation on a user's compatible device (e.g., a smartphone, a laptop computer, a personal digital assistant) and/or via an online service accessed via a web browser or some other program. The application may communicate with the appliance via Bluetooth®, WiFi®, and/or some other communication protocol.

The application may provide the user all options available at the appliance via its input/output components, and may also offer additional options (e.g., sharing of water recipes via a social network or service, search for recipes, rating recipes, organizing recipes). In some implementations, the interface afforded by the user's device may be more robust than the appliance's controls and provide easier navigation. The user may therefore create or select a water recipe at the appliance or via the application, and can adjust it as desired prior to dispensing of the prepared water.

To create a recipe, the user identifies a desired amount of water or may accept a default selection (e.g., 8 oz). He or she also indicates whether the water should be chilled or heated, and may request a particular temperature or a temperature range (e.g., approximately 40° F., room temperature). The user also selects zero or more enhancements to be added to the water. Enhancements offered to the user during the recipe creation process may or may not depend on the enhancement cartridges currently installed in the water preparation appliance. For example, enhancements not currently installed in the appliance may be omitted from enhancement options presented to the user or the display controls or the application may be configured to indicate their unavailability (e.g., by font color/size, by interlineation).

As one alternative, all known enhancements may be offered as ingredients for the recipe and the user may be prompted at some point to install necessary cartridges or cancel/modify the recipe if he/she selects an enhancement that is not currently installed. As another option, all enhancements that have previously been installed in the appliance (or used by the user) may be remembered and offered as ingredients, under the assumption that even if a particular enhancement is not currently installed, the user is likely to have it available for reinstallation.

For each selected enhancement, the user specifies an amount to be included as part of the recipe, which may be expressed in traditional volumetric units such as microliters (µl), nanoliters (nl), and so on (for enhancements that are liquid), or with a non-traditional unit such as squirts, drops, etc. A non-traditional measurement may be based on a minimum volume or mass that can be extracted from an enhancement cartridge, such as 50 nl, 0.1 ml, 0.5 g, etc.

In some embodiments, a suggested total enhancement volume (or mass for solid enhancements) may be suggested based on the user's desired quantity of water and concentrations/strengths of the installed enhancements. In these embodiments, the user may have the option of specifying enhancement quantities in terms of percentages of the total enhancement volume (e.g., 40% lemon flavoring, 40% lime flavoring, 20% agave syrup). The user may therefore quickly specify ratios among the enhancements if multiple enhancements have been selected.

After creating a recipe, the user may instruct the water preparation appliance to prepare a portion of water according the recipe, again via the application or controls of the appliance. The user may save the recipe by giving it a custom name or accepting a default name, and may operate the application to share the recipe via a social function of the application, via some other social media application or service, or via electronic mail or text. For example, the application may cooperate with social media services (e.g., Twitter®, Instagram®) and/or other applications to make it easy to search for other users' experiences with the appliance, find and/or share recipes, etc. When a user saves a recipe, whether it was created by the user or some other source, it may become available for quick selection at the appliance and/or via the application (e.g., via a menu of favorites or recently used recipes, via categories of recipes.

In some embodiments, a user may be offered one or more recipes related to specific enhancement cartridges installed in the appliance. For example, when one or more cartridges whose contents can be used to prepare or mimic a known beverage (e.g., Gatorade® Orange Thirst Quencher, Evian® bottled water) are installed, a recipe for the known beverage may be added to one or more menus displayed on the appliance and/or via the corresponding application (e.g., a quick access menu, a menu of recommended beverages).

The application (and/or a display component of the water preparation appliance) also provides the user with statuses of the appliance and/or a portion of water being prepared. For example, the user may learn whether and when an enhancement cartridge or other component (e.g., a water filter) needs to be replaced, determine the quality of the water before and/or after being filtered (e.g., in terms of TDS), observe an estimated amount of time necessary to complete preparation of a current recipe, etc.

The user may also be able to change a configuration of the appliance via the application. For example, he or she may be able to lock a cartridge to prevent its use by other users, and may be able to adjust a recipe that is in process but not complete, such as by altering the desired temperature and/or changing the enhancements (if they have not yet been added).

In some embodiments, a water preparation system (or appliance) may require or only allow use of authorized cartridges. In some implementations of these embodiments, every authorized cartridge is programmed to contain one or more identification tags or codes, which may be digitally signed and encrypted in accordance with a PKI (Public Key Infrastructure) scheme. The applied digital signature may be unique to the manufacturer of the cartridge and the tags/codes may identify the cartridge contents and/or provide other information. Upon insertion of a cartridge, the system decrypts the code and authenticates the signature before allowing the cartridge to be used. Insertion of an unauthorized cartridge (i.e., a cartridge that does not pass the authentication procedure) may prevent use of that cartridge and/or may prevent use of the system until the unauthorized cartridge is removed.

The process of authorizing cartridges may require communication between the system and a central authority (e.g., a certificate authority, a registration authority), which may be secured via a symmetric or asymmetric encryption that is distinct from the cartridge authentication cryptographic scheme.

Replacement of some components of water preparation system 100 (e.g., filter(s) 104, enhancement cartridges 116) may be automated or semi-automated as the system senses or estimates their depletion. In different implementations, and depending on a user's configuration of the system and/or the compatible application, replacement components may be ordered and shipped automatically, may be placed into an online shopping cart for perusal and acceptance by a user, or may simply be identified to the user via the application and/or display and input controls 122.

Figure 2:
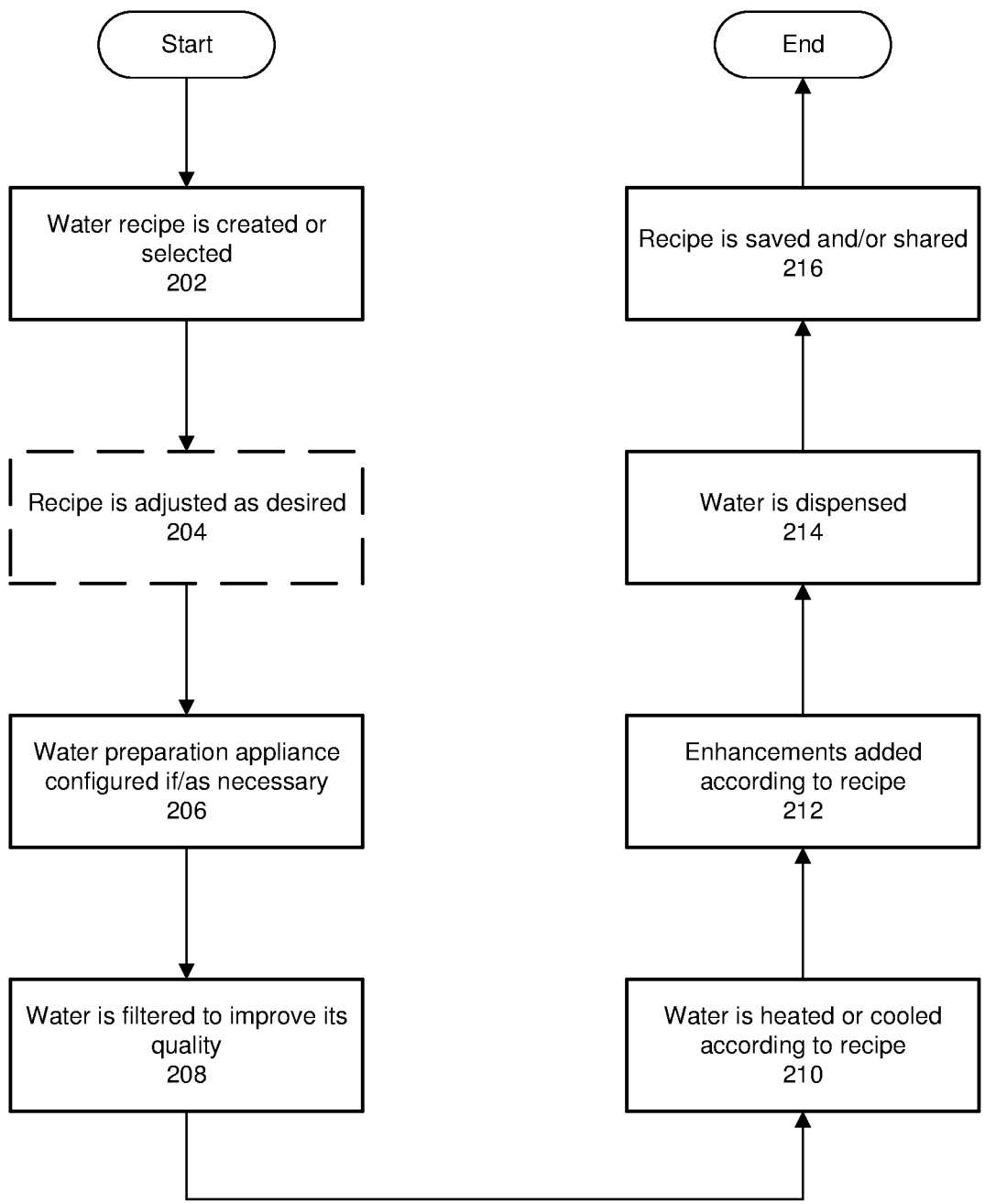
FIG. 2 is a flow chart illustrating a method of preparing water, in accordance with some embodiments.

FIG. 2 is a flow chart illustrating a method of preparing water for human consumption with a water preparation appliance (or system). In one or more embodiments, one or more of the steps may be omitted, repeated, and/or performed in a different order. Accordingly, the specific arrangement of steps shown in FIG. 2 should not be construed as limiting the scope of the embodiments described herein.

In operation 202, a water recipe is created or selected. As described above, this may be done at the water preparation appliance or via an application or interface operating on an electronic device that communicates with the appliance. Similarly, the recipe may be stored on the appliance and/or a data repository associated with the application (e.g., on the user's device or in the cloud). The recipe may have been created by the user or some other entity and then accessed by the user.

In optional operation 204, the recipe may be modified to suit the user's taste, for just one serving or permanently (in which case the modification is saved). For example, amounts or proportions of enhancements may be adjusted, the combination of enhancements may be modified (e.g., to exchange one flavor or sweetener for another), the target temperature may be increased or decreased, the output volume of water may be changed, and so on.

In operation 206, the water preparation appliance is configured or reconfigured as necessary. Illustratively, if the appliance (or the associated application) indicates that an enhancement called for by the recipe is not installed or is too low in quantity for the recipe, the user may be prompted to take action. Similarly, if the appliance does not have a permanent connection to a water source and a manually filled reservoir is empty, he or she may be prompted to add water.

If the user installs or replaces an enhancement cartridge, the appliance may automatically interrogate or examine the new/replacement cartridge (e.g., via a query/response communication with an embedded processing component, by reading a QR code on an exterior of the cartridge) and register the new cartridge with an internal set of data. If the interrogation or examination of the cartridge fails, this may signify that the cartridge is not genuine, that it is damaged, that a communication failure occurred, etc., and the user will be advised.

In operation 208, preparation of the requested water recipe can proceed. Input water is therefore filtered on demand if a reservoir or source of previously filtered water is not available. The filtering operation may include multiple stages, such as when a multi-stage reverse osmosis filtration device is employed.

In some embodiments, one or more sensors may operate to test the quality of the water pre- and post-filtering, according to TDS or some other standard. In these embodiments, the water quality or purity reported by the sensor(s) may be reported to the user via a display component of the appliance and/or the associated application. If necessary to achieve a desired or target level of purity, or if desired by a user, a serving of water sufficient to complete the recipe may be re-filtered one or more times, based on the measured TDS for example, until the measurement is acceptable.

In operation 210, the water is heated or cooled according to the recipe. This may involve multiple cycles or passes of the water across one or more thermoelectric (e.g., Peltier) components in addition to or instead of drawing upon a reservoir of preheated or precooled water. If the user has requested the water be prepared at room temperature, this operation may be unnecessary.

In operation 212, enhancements are added in specified doses or proportions according to the recipe. In some embodiments, enhancement cartridges are contained in a carousel or other type of rotatable component so that each required enhancement cartridge can be positioned appropriately (e.g., proximate to a dispenser nozzle, above a path of the water as it approaches the nozzle, above a receptacle or reservoir in which the prepared water is mixed) and the specified quantity of each enhancement can be drawn or expelled from the cartridges. For example, as each required enhancement cartridge is rotated into position, a piezoelectric injector component of the cartridge is activated to release the corresponding quantity of the enhancement or a single injector or other pumping component may service all cartridges at a fixed position. If mixing is required, operation 212 also includes this action.

In operation 214, the prepared water is dispensed into the user-provided receptacle. As indicated above, the enhancements may be added to the water stream before it departs a dispenser nozzle, may be released into the receptacle as a separate stream or output, or the water and enhancement(s) may be mixed before the water is dispensed.

In operation 216, the recipe used to prepare the water may be saved and/or shared (e.g., via the associated application). For example, the appliance may automatically save the last N recipes that were used (N≥1), may categorize the recipes according to which user is currently operating the appliance, primary enhancement(s), relative temperatures (e.g., cooled, heated), a rating provided by the user (e.g., designation as a 'favorite,' a star rating), and/or other characteristics, etc. Favorites may be retained to allow quick (e.g., one-touch) activation.

Figure 3:
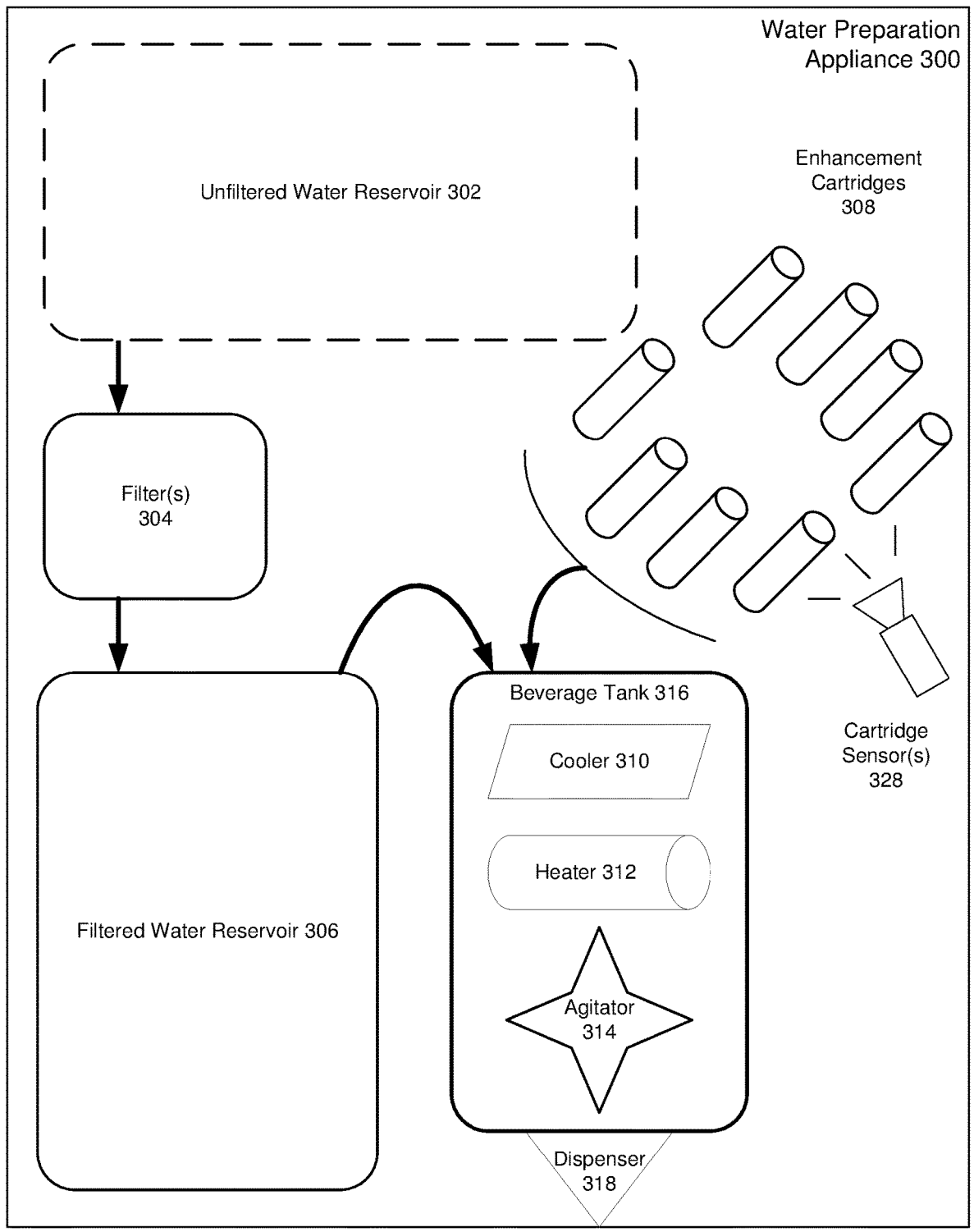
FIG. 3 is a diagram of a water preparation appliance, in accordance with some embodiments.

FIG. 3 is a block diagram of a water preparation appliance according to some embodiments. The diagram does not limit the configuration of an appliance constructed according to other embodiments. For example, the size, number and/or types of components of the water preparation appliance may vary depending on whether it is configured for private use or for commercial use, and/or other factors.

The water preparation appliance of FIG. 3 may feature optional reservoir 302 of unfiltered water (e.g., tap water), which may be manually filled by a consumer or may be filled automatically from a permanent connected source (e.g., a municipal water authority). One or more filters 304 filter water from reservoir 302 (or water received directly from a connected source), and outputs filtered water to filtered water reservoir 306.

In different implementations, filter(s) 304 may be gravity-based filters (e.g., composed of activated charcoal or alumina) or pressure-based filters (e.g., a reverse osmosis filter). In the latter case, appliance 300 includes a pump for feeding pressurized water to filter(s) 304) and a drain (not shown in FIG. 3). Filter(s) 304 are accessible by the consumer (i.e., to replace used filters).

Filtered water reservoir 306 is of sufficient volume (e.g., 1 liter, 2 liters) to support one or multiple servings of prepared water and is refilled automatically as it empties. Reservoir 306 may include or operate in conjunction with an appropriate pump (e.g., a submersible pump) or other means for transferring filtered water from the reservoir to beverage tank 316.

Enhancement cartridges 308 contain various enhancements to be added to the consumer's water. As described above, the enhancements may contain flavoring agents, sweeteners, nutrients, and/or other substances in a liquid, gel or solid (e.g., powder) form. Cartridges 308 of appliance 300 are tubular in shape and may operate similar to syringes in that a plunger or piston is actuated as necessary to release an appropriate amount of an enhancement to be input to beverage tank 316.

Enhancement cartridges 308 may be loaded (by the consumer) into a rotatable mechanism that rotates to place one cartridge at a time into position for extracting or expelling a specified amount of its contents (specified by the water recipe currently being prepared) with the assistance of a stepper motor that drives a plunger. The position of each cartridge's plunger is saved (e.g., in nonvolatile memory) after each use so that each use of the cartridge can be exact and also to determine how full when the cartridge is (e.g., and initiate a notification to the consumer that the cartridge should be replaced).

In some embodiments, enhancements are injected into tubing that connects filtered water reservoir 306 to tank 316. In other embodiments, the enhancements are delivered to tank 316 separately from the filtered water.

Within beverage tank 316, cooler 310 and/or heater 312 operate as needed to chill or heat prepared water before (or as) it is dispensed for consumption. Illustratively, cooler 310 may comprise one or more peltier-type thermoelectric devices, while heater 312 may comprise one or more cartridge heaters.

One or more agitators 314 provide agitation to help mix the prepared water, and may comprise one or more of cooler 310 and heater 312. Illustrative agitators include butterfly and impeller/propeller types. Multiple agitators may cooperate to cause the liquid contents of the beverage tank to flow past cooler 310 and heater 312 in embodiments in which the cooler and heater are separate from the agitator.

The floor or bottom of tank 316 may be inclined downward toward dispenser 318 to facilitate full evacuation of the tank after the consumer's water is mixed and brought to a target temperature. In addition to or instead of the use of gravity to evacuate the beverage tank, a suitable pump (e.g., a submersible peristaltic pump) may extract the prepared water and output it to/via dispenser 318.

One or more cartridge sensors 328 sense and/or identify insertion and/or removal of individual cartridges. For example, in an embodiment in which enhancement cartridges 308 are housed in a carousel or other rotatable component, a single sensor (e.g., a camera, an RFID reader) may identify each cartridge when appliance 300 is turned on, when a recipe is to be prepared, and/or at other times. In other embodiments (e.g., in which the cartridges are stationary), a separate sensor may be situated in or near each cartridge bay to identify each bay's occupant.

In some embodiments, to prevent or reduce the likelihood of accidental dispensing of the prepared water (e.g., before a suitable receptacle is in place), a button (e.g., a hard button, an icon on display screen) may need to be activated before the water is dispensed, even if the current water recipe was selected and activated remotely (e.g., by a compatible water preparation app). A second recipe (i.e., a recipe to be prepared after the current recipe) may begin automatically after the current serving is dispensed.

In some embodiments, prepared water may be enhanced with carbonation. In these embodiments, appliance 300 includes an internal or external dock or other receptacle for insertion of a $CO_2$ cartridge. Filtered water (from reservoir 306) is mixed with carbon dioxide gas in a separate (pressurized) chamber before being mixed with contents of beverage tank 316, either within tank 316 or as the prepared water is being dispensed.

Figure 4:
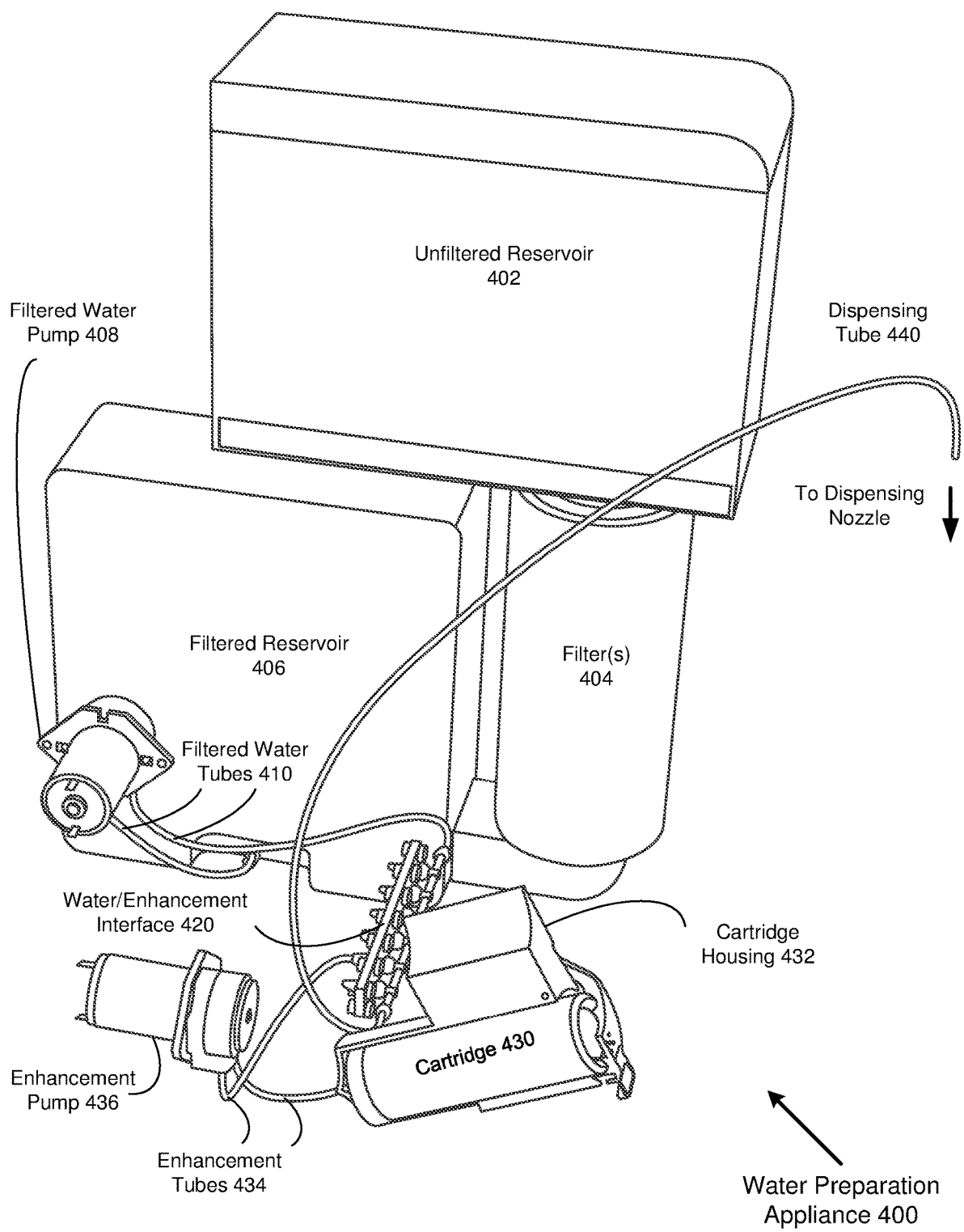
FIG. 4 illustrates components of a water preparation appliance, in accordance with some embodiments.

FIG. 4 illustrates components of a water preparation appliance, according to some embodiments. In these embodiments, the illustrated components are housed within a table-top appliance or some other suitable device (e.g., a refrigerator, a self-standing water cooler).

Water appliance 400 of FIG. 4 includes unfiltered reservoir 402 that is manually filled by a user or automatically filled via a plumbed water connection, and filtered reservoir 406 that holds filtered water for use on demand when preparing a water recipe. One or more filters 404 filter water one or more times before it is stored in filtered reservoir 406.

Filtered water pump 408 pumps filtered water from reservoir 406 through filtered water tubes 410. Tubes 410 may include separate sections from the reservoir to the pump and from the pump to water/enhancement interface 420 where one or more enhancements are added to the water stream before it is dispensed via dispensing tube 440.

Cartridge 430 is an enhancement cartridge that, as described previously, may contain any type of enhancement that the appliance can use. Cartridge 430 is housed in a cartridge housing 432 that holds the cartridge in place and that may perform other functions. For example, the cartridge housing may employ one or more sensors for reading information printed on an exterior of the cartridge, for interrogating internal circuitry of the cartridge to obtain pertinent data, to ensure the cartridge is installed with a specific orientation, etc. As discussed previously, the information/data garnered from a cartridge may identify the type of enhancement it contains, an expiration date of the enhancement, a source of the cartridge, etc.

Contents of cartridge 430, which may be liquid in form, are extracted via enhancement tubes 434 and enhancement pump 436. Pump 436 feeds the extracted enhancement to water/enhancement interface 420. Although only one cartridge 430 is shown in FIG. 4 (for the purpose of clarity), embodiments of the appliance may house any number of cartridges. Illustratively, each cartridge has a separate housing 432 and a dedicated pump 436, although in other embodiments multiple cartridges may share a housing and/or pump.

Figure 5:
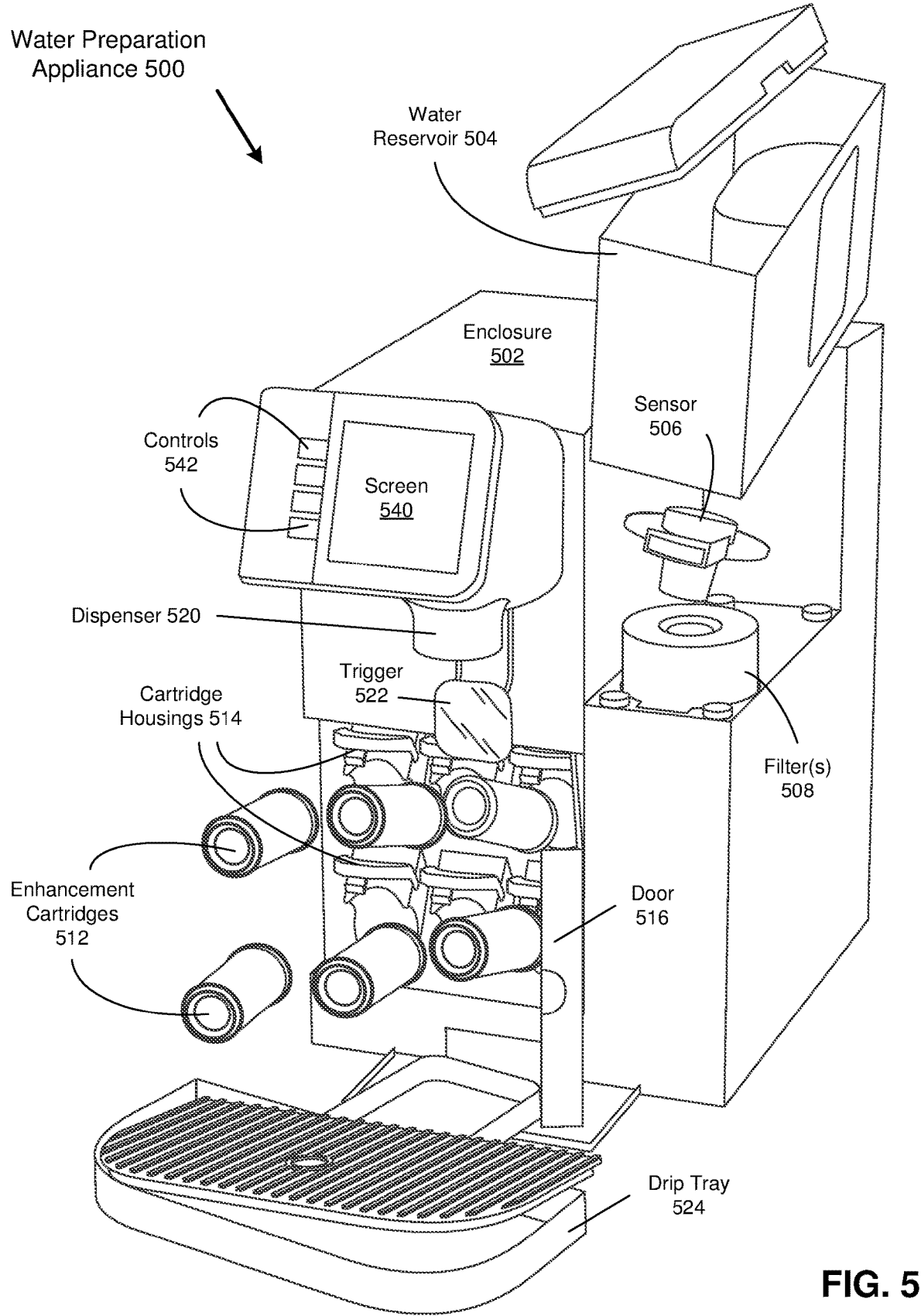
FIG. 5 is a diagram of a water preparation appliance, in accordance with some embodiments.

FIG. 5 is a diagram of a water preparation appliance, according to some embodiments.

Appliance 500 of FIG. 5 is housed within enclosure 502, and features a user-refillable reservoir 504, which may have a flip-top or removable lid. From reservoir 504, unfiltered water passes sensor 506 (which may provide a measure of TDS and/or other data) and enters filter(s) 508. Filtered water may be stored in an internal reservoir (not shown in FIG. 5) before being enhanced and dispensed.

Appliance 500 includes six cartridge housings 514 and may thus house up to six enhancement cartridges 512 at one time. Door 516 provides access to the cartridges and cartridge housings. After a water recipe is prepared, the water is dispensed via dispenser 520, which may only allow the prepared water to flow when or while trigger 522 is pressed (e.g., with a receptacle, with a user's hand). Drip tray 524 is positioned to catch spilled water. Appliance 500 may feature an internal or external rack for storing extra enhancement cartridges (i.e., cartridges not currently installed in cartridge housings 514).

Screen 540 (which may be a touch-screen) provides information to a user, in addition to or instead of a compatible application described above. For example, controls 542 may be manipulated to select (or create) a water recipe and to begin the preparation process. As the preparation progresses, its status may be displayed on the screen. Screen 540 may also display warnings (e.g., depletion of a cartridge, low water level, cleaning required), report on a temperature within an internal water reservoir, reveal the detected purity of water before and/or after being filtered (e.g., as TDS), prompt the user to press trigger 522 to dispense the prepared water, etc.

Electronics for operating water preparation appliance 500 may be located within enclosure 502 behind screen 540 (e.g., microprocessor, radio, volatile and/or non-volatile memory, supporting circuitry). An antenna for communicating externally (e.g., to interface with a compatible application and/or other services via a Wi-Fi network) may be embedded within enclosure 502 or may extend from the enclosure.

An environment in which one or more embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processed included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A water preparation appliance comprising:
   a first processor;
   a first memory;
   a water preparation application simultaneously executed by the first processor and by a second processor of a portable electronic device operated by a user of the water preparation appliance;
   a water chiller;
   a water heater;
   multiple containers of water enhancements;
   a dispenser; and
   a display component controlled by the first processor to identify to the user one or more of:
     types of water enhancements contained by the multiple containers; and
     recipes that can be prepared using the types of water enhancements contained by the multiple containers.

2. The water preparation appliance of claim 1, further comprising:
   a water input; and
   a filter.

3. The water preparation appliance of claim 1, further comprising:
   one or more sensors configured to test a purity of the water.

4. The water preparation appliance of claim 1, wherein the display component is at least partially controlled by the water preparation application executed by the second processor.

5. The water preparation appliance of claim 1,
   wherein the memory and/or a second memory of the electronic device store one or more recipes for preparing water.

6. The water preparation appliance of claim 1, wherein the water preparation application is further executed by the second processor to share recipes with users of other water preparation appliances.

7. The water preparation appliance of claim 5, wherein the display component is further controlled by the first processor to identify a first water enhancement needed to prepare a selected recipe when none of the multiple containers contain the first water enhancement.

8. The water preparation appliance of claim 1, further comprising:
   a water input;
   one or more water filters; and
   an input component that receives from the user a selection of a water recipe to prepare;
   wherein the display component is further controlled by the first processor to:
     display one or more recipes that require at least one type of water enhancement that is not contained in the multiple containers; and
     when none of the multiple cartridges contain a first enhancement required for the selected water recipe, prompt the user to insert an additional container containing the first enhancement.

9. The water preparation appliance of claim 8, wherein:
   the one or more filters comprise a reverse-osmosis filter; and
   the water preparation appliance further comprises a waste water output for outputting waste water from the reverse-osmosis filter.

10. The water preparation appliance of claim 8, further comprising one or more of:
    a first sensor for testing a quality of the water after it is received from the water input and before the water enters the one or more filters; and
    a second sensor for testing the water after it is filtered by the one or more filters.

11. The water preparation appliance of claim 8, further comprising:
a single enclosure enclosing the one or more water filters, the water chiller, the water heater, and the multiple containers.

12. The water preparation appliance of claim 1, further comprising means for automatically identifying a type of water enhancement contained in each of the multiple containers.

13. The water preparation appliance of claim 12, wherein the means for automatically identifying a type of water enhancement contained in a container comprises one or more optical sensors for reading an identification feature of the container.

14. The water preparation appliance of claim 12, wherein the means for automatically identifying a type of water enhancement contained in a container comprises circuitry for electronically communicating with the container.

15. The water preparation appliance of claim 1, wherein each of the multiple containers is removably installed in a separate housing.

16. The water preparation appliance of claim 1, further comprising a rotatable carousel housing the multiple containers.

17. The water preparation appliance of claim 1, wherein the multiple containers include:
at least one container containing a flavoring agent; and
at least one container containing a sweetener.

* * * * *